(12) United States Patent
Lalancette

(10) Patent No.: US 7,273,982 B1
(45) Date of Patent: Sep. 25, 2007

(54) ELECTRICAL BOX EXTENDER MECHANICAL FASTENER

(75) Inventor: Daniel Lalancette, Saint-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/644,378

(22) Filed: Dec. 22, 2006

(51) Int. Cl.
*H01H 9/02* (2006.01)

(52) U.S. Cl. .............................. 174/58; 174/53; 174/57; 174/50; 220/3.2; 220/3.3; 248/906

(58) Field of Classification Search ................ 174/480, 174/481, 50, 53, 57, 58, 17 R, 61, 62; 220/3.2–3.9, 220/4.02; 439/535, 536, 537; D13/152
See application file for complete search history.

(56) References Cited

U.S. PATENT DOCUMENTS

| | | | |
|---|---|---|---|
| 938,373 A | 10/1909 | Eden | |
| 1,420,694 A | 6/1922 | Gore | |
| 1,557,066 A | 10/1925 | Krantz | |
| 1,672,263 A | 6/1928 | Kruse | |
| 1,734,322 A | 11/1929 | Appleton | |
| 2,544,232 A | 3/1951 | Kennedy | |
| 2,625,288 A | 1/1953 | Clark et al. | |
| 2,714,519 A | 8/1955 | Hill | |
| 2,732,090 A | 1/1956 | Karlin | |
| 2,737,313 A | 3/1956 | Schell | |
| 2,848,134 A | 8/1958 | Carlson | |
| 2,850,202 A | 9/1958 | Schneider et al. | |
| 3,083,856 A | 4/1963 | Appleton | |
| 3,115,265 A * | 12/1963 | Mulkey et al. | 220/3.7 |
| 3,941,274 A | 3/1976 | Tattam | |
| 4,134,636 A * | 1/1979 | Kleinatland et al. | 174/58 |
| 4,715,507 A | 12/1987 | Chamberlin | |
| 4,734,971 A | 4/1988 | Dupasquier | |
| 5,117,996 A * | 6/1992 | McShane | 174/57 |
| 5,402,902 A * | 4/1995 | Bouley | 220/3.2 |
| 5,975,323 A * | 11/1999 | Turan | 220/3.7 |
| 6,369,322 B1 * | 4/2002 | Gretz | 174/50 |
| 7,002,076 B2 * | 2/2006 | Ungerman et al. | 174/58 |
| 7,235,739 B2 * | 6/2007 | King et al. | 174/58 |

* cited by examiner

*Primary Examiner*—Angel R. Estrada
(74) *Attorney, Agent, or Firm*—Hoffman & Baron, LLP

(57) ABSTRACT

An extender and a method for making an extender for an electrical box is provided. The extender includes: a side wall having a length with first and second ends and a width with first and second edges, wherein the side wall is configured so that the first and second ends are in contact with each other. The extender also includes: a first member extending from the first end; a first embossed area on the first end; a second member extending from the second end; and a second embossed area on the second end. The first member is bent so that it contacts the second embossed area and the second member is bent so that it contacts the first embossed area to connect the first and second ends. The extender can have a pair of tabs extending from the first edge on opposing wall sections and each tab can have a mounting screw aperture.

17 Claims, 5 Drawing Sheets

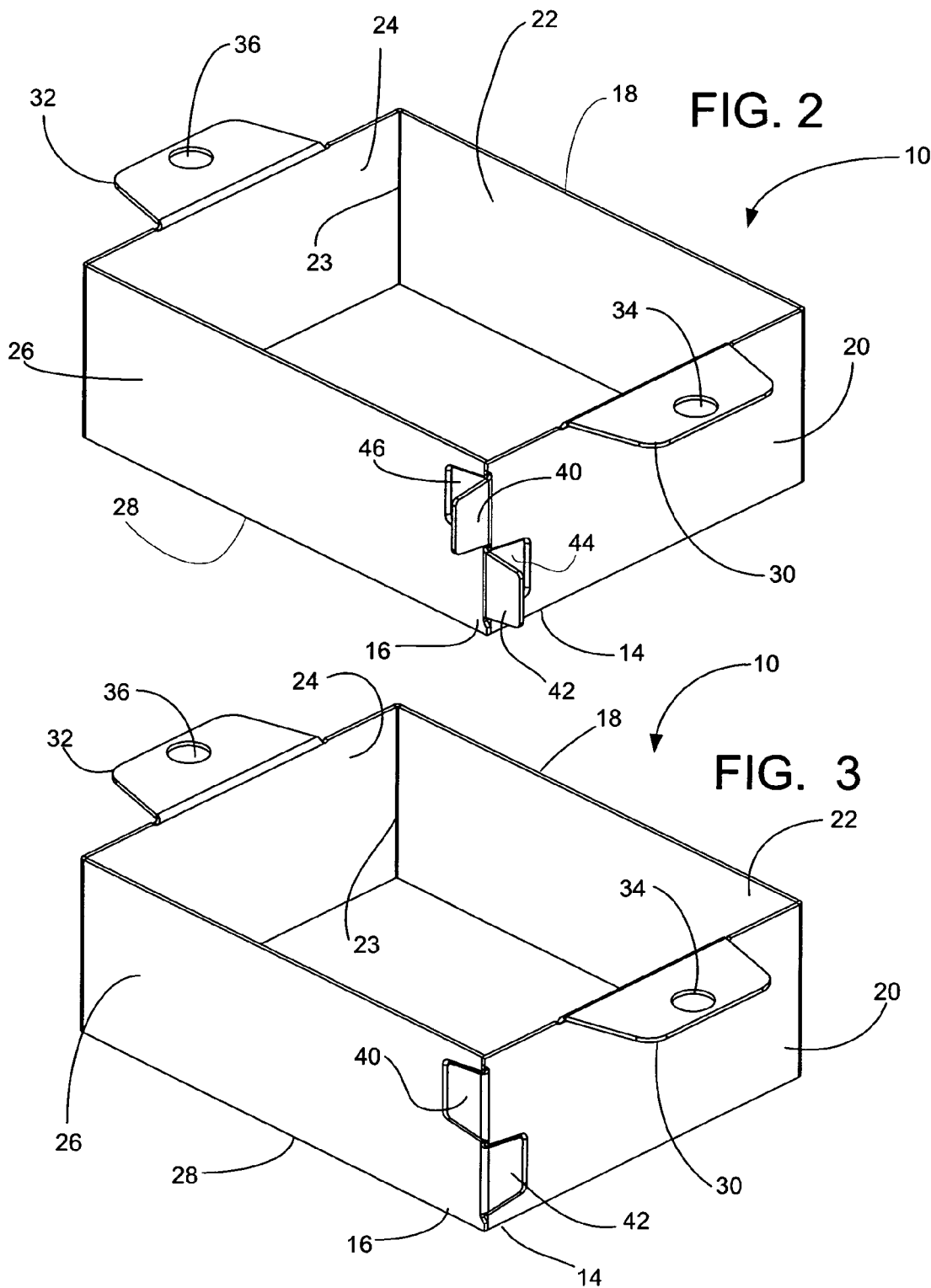

ELECTRICAL BOX EXTENDER MECHANICAL FASTENER

FIELD OF THE INVENTION

The present invention relates to extenders for electrical outlet boxes mounted in renovated walls or installed too deep in a wall. In particular, the invention relates to extenders that are used to modify electrical outlet boxes that can be easily and inexpensively manufactured.

BACKGROUND OF INVENTION

The use of electrical outlet boxes (also referred to herein as outlet boxes) for housing electrical devices and connecting wires is well known in the prior art. These boxes come in a variety of different shapes (typically, square, round and rectangular) and can house electrical receptacle or switches that are mounted in walls for connecting electrical devices and operating lights and appliances. In new construction, a box is typically attached to a wall stud and the front face of the box extends beyond the stud so that it will be flush with the surface of the wall that is attached to the stud. For example, when the wall is formed from one-half inch thick sheet rock, the face of the box extends approximately one-half inch beyond the stud. When a receptacle or switch is installed in the box and a cover plate attached, the cover plate will lie flat on the surface of the wall.

However, the thickness of the wall can sometimes change when a new wall covering is installed over an existing wall. Renovations frequently include the installation of new sheet rock over existing walls. In these cases, the front face of an existing electrical box will not be flush with the new wall surface and may be recessed from the new wall surface by one-half an inch or more. In order to modify the electrical boxes to fit the new wall thickness, a switch box extender must be attached to the existing box. When properly attached, the front face of the extender is flush with the surface of the new wall.

Switch box extenders or extenders, that are currently in use, typically have walls that correspond to the walls of an outlet box and an opening in the middle for accessing the box. An extender for a round box can have a single curved wall, while an extender for a square or rectangular box would have four walls. The extenders generally correspond in size to the electrical box opening so that they can be inserted into the front of the box with the exterior walls of the extender received by the interior walls of the box. A variety of different means are used to secure the extender to the box, including screws, clips and fasteners. An extender is attached to the front face of the existing box and sized so that the front face of the extender is flush with the surface of the new wall covering. Accordingly, these extenders come in different sizes to accommodate different wall thicknesses and electrical outlet boxes of different sizes. Typically, the extenders provide between ⅛-inch and 1-inch of extension to the existing switch box.

The most commonly used extenders for electrical boxes are manufactured by a process that includes a metal stamping step, a folding (or bending) step and a welding step. Typically, these extenders are made from a flat piece of sheet metal which is stamped into a substantially rectangular shape and folded over to form two pairs of opposing side walls with four corners. The corner that is formed by the two ends of the piece of sheet metal are then welded together to complete the extender. For a round box, the ends of a single curved wall are welded together. The cost to produce these extenders is made up mostly by the manufacturing cost since the cost of the raw materials (the sheet metal) is relatively small. Therefore, in order to reduce the production cost, there is a need for extenders that can be manufactured more efficiently and less expensively.

SUMMARY OF THE INVENTION

In accordance with the present invention, an extender for an electrical box is provided that can be more easily manufactured at a lower cost. The extender includes: a side wall having a length with first and second ends and a width with first and second edges, wherein the side wall has four lengthwise wall sections which are configured to form two pairs of opposing and substantially parallel wall sections. The extender also includes: a first member extending from the first end; a first embossed area on the first end; a second member extending from the second end; and a second embossed area on the second end. After the side wall is formed into two pairs of wall sections, the first member is bent so that it contacts the second embossed area and the second member is bent so that it contacts the first embossed area and thereby connect the first and second ends. The extender can also have a pair of tabs extending from the first edge on opposing wall sections and each tab can have a mounting screw aperture.

For round outlet boxes, the extender is formed from a single wall section, which is curved so that the opposing ends contact each other. For hexagonal and octagonal shaped outlet boxes, the extender has six and eight lengthwise wall sections, respectively, which are configured to form three and four pairs, respectively, of opposing and substantially parallel wall sections. The round and hexagonal and octagonal shaped extenders all have a side wall having a length with first and second ends and a width with first and second edges. For the hexagonal and octagonal shaped extenders, the side wall has six and eight lengthwise wall sections, respectively, which are configured to form three and four pairs, respectively, of opposing and substantially parallel wall sections. All of these extenders include: a first member extending from the first end; a first embossed area on the first end; a second member extending from the second end; and a second embossed area on the second end. After the side wall is formed and configured so that the opposing ends of the sidewall are in contact with each other, the first member is bent so that it contacts the second embossed area and the second member is bent so that it contacts the first embossed area and thereby connect the first and second ends. These extenders can also have a pair of tabs extending from the first edge on opposing wall sections (or, in the case of the round extender, tabs are 180 degrees apart) and each tab can have a mounting screw aperture.

The invention also includes a method of making an electrical box which includes: providing a substantially flat piece of sheet metal; die stamping the piece of sheet metal to form a side wall having a length, a width, a first end and a second end; bending the side wall lengthwise at three, five or seven points to form two, three or four pairs of opposing and substantially parallel wall sections; and connecting the first and second ends of the side wall. In another embodiment, instead of bending the side wall at three, five or seven points, the side wall is curved into a substantially round shape and the opposing ends are connected. The side wall can also have: a first member extending from the first end; a first embossed area on the first end; a second member extending from the second end; and a second embossed area on the second end. The first and second ends of the side wall can be connected by bending the first member so that it contacts the second embossed area and bending the second member so that it contacts the first embossed area. For rectangular, hexagonal and octagonal extenders, the side wall, preferably, has three, five or seven widthwise bending points, respectively, which are formed into corners when the side wall is bent.

In a preferred embodiment of the electrical box extender, the first embossed area includes a first aperture or a depressed area, the second embossed area includes a second aperture or a second depressed area, the first member includes a first raised portion and the second member includes a second raised portion. The first aperture or the first depressed area engagingly receives the second raised portion and the second aperture or the second depressed portion engagingly receives the first raised portion when the first end of the extender is connected to the second end.

Preferably, the four, six or eight lengthwise wall sections are formed by bending the side wall by approximately 90, 60 or 45 degrees, respectively, at three, five or seven points, respectively, along the length of the side wall. In a preferred embodiment three, five or seven grooves, perpendicular to the length of the side wall, are located at the bending points to facilitate bending. One of the two pairs of opposing wall sections for some of the rectangular extenders is longer than the other pair, while all of the wall sections for square, hexagonal and octagonal shaped extenders have approximately the same length.

The first member has a first width and the second member has a second width, both of which are less than one half the width of the side wall. The width of the side wall has a midpoint and the first member is located between the first edge and the midpoint of the side wall and the second member is located between the second edge and the midpoint of the side wall. The first embossed area is located between the second edge and the midpoint and the second embossed area is located between the first edge and the midpoint. When the extender is formed by bending the side wall, the first end contacts the second end and the first member is in corresponding alignment with the second embossed area and the second member is in corresponding alignment with the first embossed area.

BRIEF DESCRIPTION OF THE FIGURES

The preferred embodiments of the electrical box extender of the present invention, as well as other objects, features and advantages of this invention, will be apparent from the following detailed description, which is to be read in conjunction with the accompanying drawings wherein:

FIG. 2 is a peripheral view of the side wall after it has been configured to form an embodiment of the extender having a rectangular shape.

FIG. 3 is a peripheral view of the side wall after it has been configured to form an embodiment of the extender having a rectangular shape and after the members on the opposing ends are connected to the embossed areas.

DETAILED DESCRIPTION OF THE INVENTION

The present invention is an extender for an electrical box and a method of forming the extender. The extender is intended to be attached to an existing electrical box after a new wall covering has been installed and the front of the electrical box is recessed from the new wall surface. The extenders come in different sizes and shapes to fit a variety of different electrical boxes. Preferred shapes are rectangular, hexagonal, octagonal and round. The extender is selected so that the face of the extender is flush with the surface of the newly installed wall after it has been attached to the box.

The extender is formed from a piece of sheet metal using well know metal stamping methods. In preferred embodiments, a substantially flat side wall having one, four, six or eight side wall sections with a member and an embossed area on each of the opposing ends is formed. The side wall is curved to form a round extender, or bent at three places, five or seven to form a substantially rectangular, hexagonal or octagonal shape, respectively, that corresponds to the shape of the opening of an electrical outlet box. When the opposing ends of the side wall are in contact with each other, the member on the first end of the side wall is in corresponding alignment with the embossed area on the second end of the side wall and, similarly, the member on the second end is correspondingly aligned to the embossed area on the first end. The members are then bent over and folded into the embossed areas to attach the two ends together. In one embodiment, the embossed areas have an aperture or depressed area and the members have a raised portion, which is located so that the raised portion is frictionally engaged by the aperture or depressed area when the two ends of the side wall are attached. In another embodiment, the aperture or depressed area and raised portion form a snap connection, which locks the two ends of the side wall together.

The extender is inserted into the outlet box so that the outside walls of the extender contact the interior walls of the outlet box. This helps to maintain the shape of the extender and prevents the members from disengaging the embossed areas. The sheet metal is electrically conductive, preferably carbon or galvanized steel, and has a thickness which allows it to be bent, preferably a thickness of from about 10 to about 28 gauge (i.e., about 0.1345 inches to about 0.0149 inches), most preferably from about 20 to about 24 gauge (i.e., about 0.0359 inches to about 0.0239 inches). The extender is preferably made from a metal that can be bent without breaking and that will substantially retain its shape after it has been bent. The bending is preferably done as part of the sheet stamping process, but it can also be done using a tool, such as a pliers or vice grip.

Figure 1:
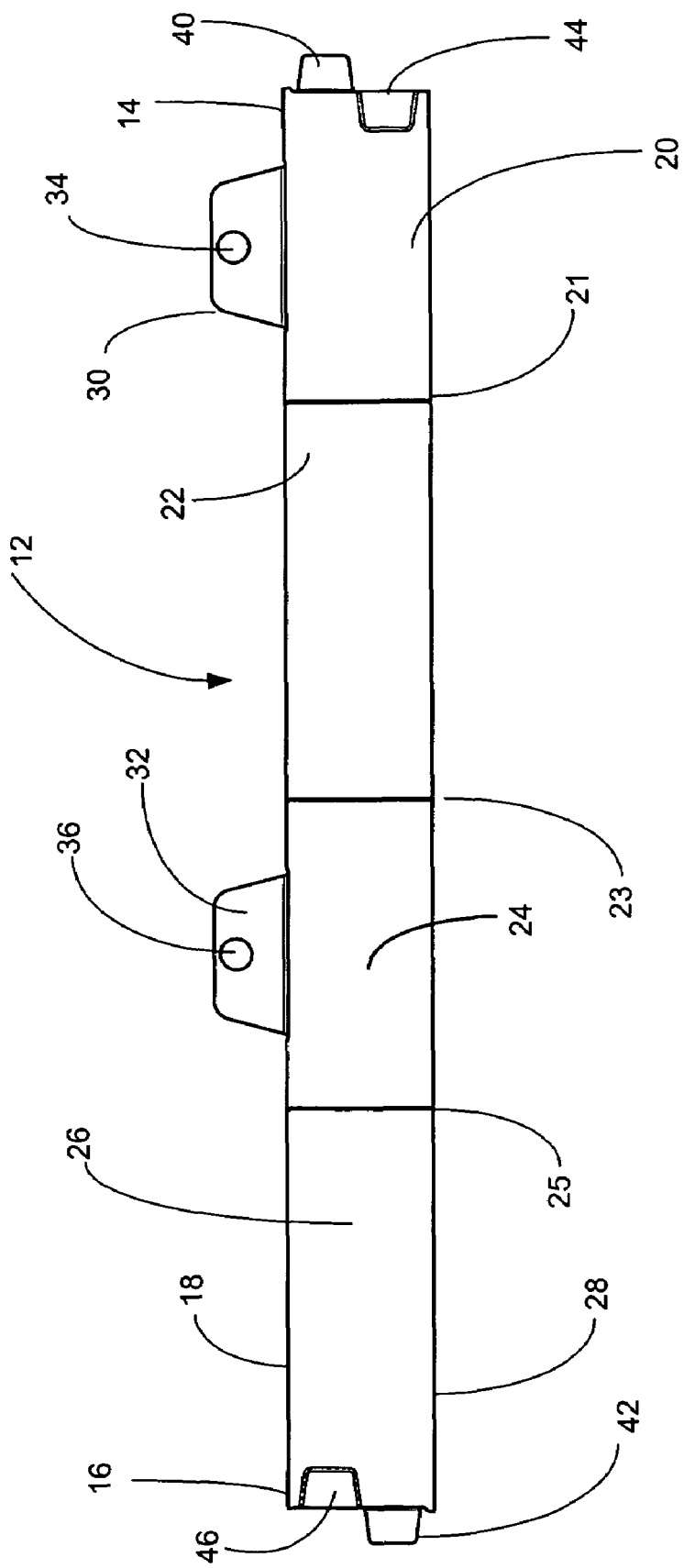
FIG. 1 is a side view of the side wall prior to forming an embodiment of the extender having four wall sections.

The invention is now described in more detail with reference to the drawings. FIG. 1 shows an embodiment with a die stamped side wall 12, which is used to form the extender 10. The side wall 12 is substantially rectangular in shape and has first and second ends 14, 16 and first and second side edges 18, 28, which correspond to the front and rear edges of the extender 10 when it is formed (see FIG. 2). The side wall 12 is die stamped to form four wall sections 20, 22, 24, 26, which are bent at three bending points 21, 23, 25. In preferred embodiments, grooves perpendicular to the length of the side wall are located at these bending points to facilitate bending. The bending points 21, 23, 25 are spaced to form a first pair of wall sections 20, 24 having substantially the same length and a second pair of wall sections 22, 26 having substantially the same length.

The first and second ends 14, 16 of the side wall 12 have a first member 40 and a second member 42, respectively, extending outwardly from the ends of the side wall 12. In the embodiment shown, the first member 40 is located between the longitudinal axis of the side wall 12 and the first edge 18 and the second member 42 is located between the longitudinal axis and the second edge 28. The first end 14 of this embodiment also has a first embossed area 44 located between the longitudinal axis and the second edge 28 and the second end 16 has a second embossed area 46 located between the longitudinal axis of the side wall 12 and the first edge 18. When the side wall 12 is bent along the bending points 21, 23, 25 to form the extender 10, the first member 40 is engagingly received by the second embossed area 46 and the second member 42 is engagingly received by the first embossed area 44.

A pair of tabs 30, 32 extend from the first edge 18 of two wall sections 20, 24. Each tab 30, 32 includes an aperture 34, 36. When the extender 10 is formed from the side wall 12, the tabs 30, 32 are bent about 90 degrees so that they are substantially perpendicular to the exterior surfaces of the wall sections 20, 24 (see FIG. 2). The apertures 34, 36 in the tabs 30, 32 correspond to the mounting hole apertures in an existing electrical box. When the extender 10 is attached to an existing electrical box (see FIG. 6), the mounting screws (not shown) pass through the apertures 34, 36.

FIG. 2 shows the extender 10 after the side wall 12 shown in FIG. 1 has been bent along the three bending points 21, 23, 25 and before the first and second members 40, 42 have engaged the first and second embossed areas 44, 46. In preferred embodiments, the embossed areas 44, 46 have a sufficient depth so that, when the members 40, 42 are folded into the embossed areas 44, 46, the surface of the members 40, 42 substantially corresponds to the surface of the wall sections 20, 24. The first edge 18 of the side wall 12 forms the front edge of the extender 10 and the second edge 28 of the side wall forms the rear edge. The tabs 30, 32 on the opposing wall sections 20, 24 are bent so that they are substantially perpendicular to the exterior surfaces of the wall sections 20, 24. When the extender 10 is attached to an existing electrical box (see FIG. 6) using the apertures 34, 36, the front edge 18 is substantially flush with the surface of the wall.

FIG. 3 shows the extender 10 shown in FIG. 2 after the first and second members 40, 42 have engaged the first and second embossed areas 44, 46. The extender 10 is assembled and ready to be attached to an existing electrical box. The members 40, 42 keep the side wall sections 20, 28 from shifting position and becoming disengaged. When the extender 10 is inserted into an outlet box 90, the exterior walls of the extender 10 fit snugly against the interior walls of the outlet box 90.

Figure 4:
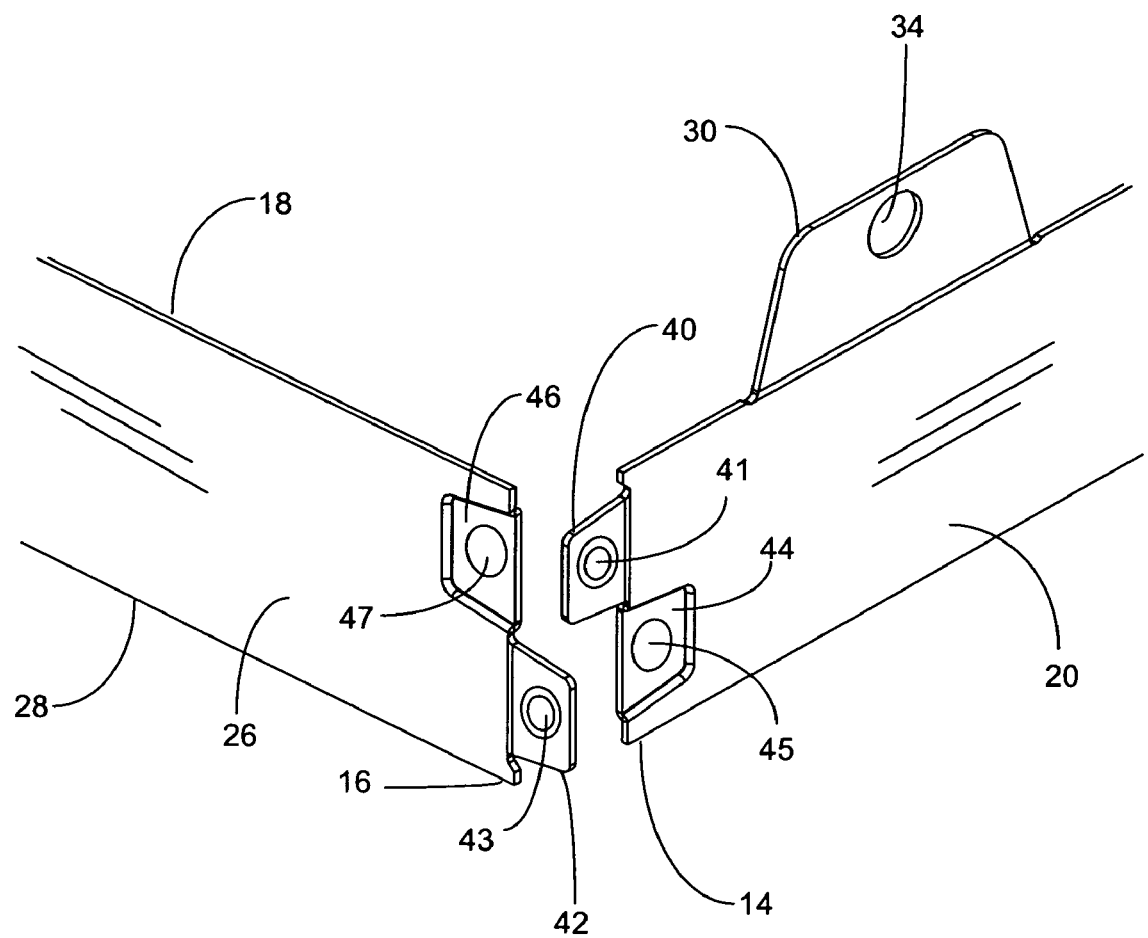
FIG. 4 is a detail view of the ends of an alternate embodiment of the extender being joined together.

FIG. 4 shows a detail of a preferred embodiment of the extender 10, wherein the first end 14 of the side wall 12 is being joined to the second end 16 to form the extender 10. The first member 40 on the first end 14 corresponds in location, size and shape to the second embossed area 46 on the second end 16. Similarly, the second member 42 on the second end 16 corresponds to the first embossed area 44 on the first end 14. When the first member 40 is folded into the second embossed area 46 and the second member 42 is folded into the first embossed area 44, the first and second ends 14, 16 of the side wall 12 are connected to form the extender 10. In this embodiment, each of the members 40, 42 can have a raised portion 41, 43 and each of the embossed areas 44, 46 can have an aperture or depressed area 45, 47. The raised portions 41, 43 are located on the members 40, 42 so that they align with the aperture or depressed areas 45, 47 in the corresponding embossed areas 44, 46. The raised portions 41, 43 frictionally engage the aperture or depressed areas 45, 47 to lock the members 40, 42 into the embossed areas 44, 46.

Figure 5:
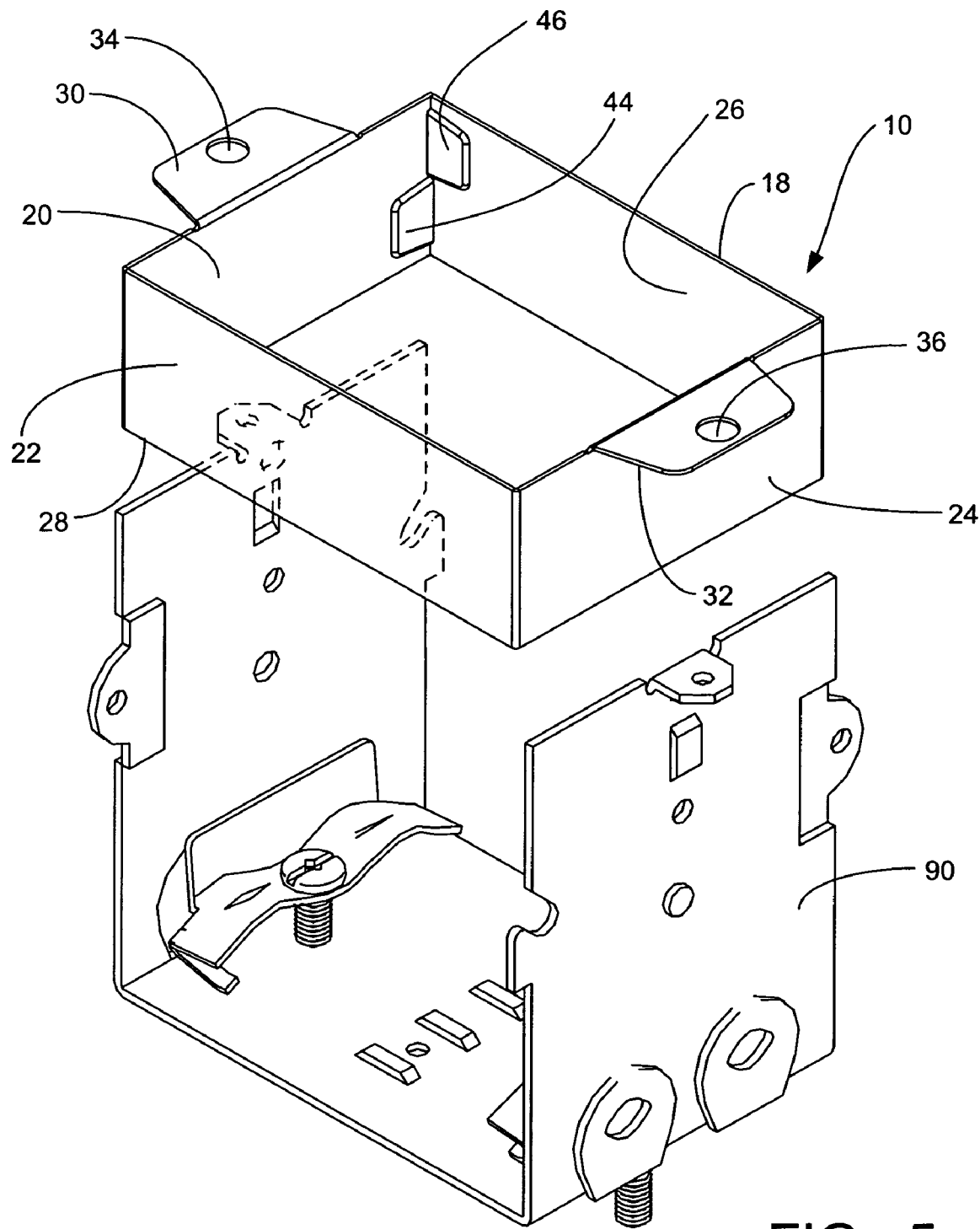
FIG. 5 is a peripheral view of a rectangular embodiment of the extender and an electrical outlet box before they are joined together.

FIG. 5 shows the extender 10 shown in FIG. 3 positioned over an existing outlet box 90, with the apertures 34, 36 in the tabs 30, 32 aligned with the mounting screw apertures of the electrical box 90. When the screws (not shown) are inserted through the apertures 34, 36 of the extender 10 and the apertures of the outlet box, the extender 10 is secured to the box 90. The extender 10 is sized so that the exterior walls of the extender 10 contact the interior walls of the outlet box 90. Because the members 40, 42 (see FIG. 4) are folded into the embossed areas 44, 46, the exterior wall of the extender 10 is substantially flat and the members 40, 42 do not interfere with inserting the extender 10 into the outlet box 90.

Figure 6:
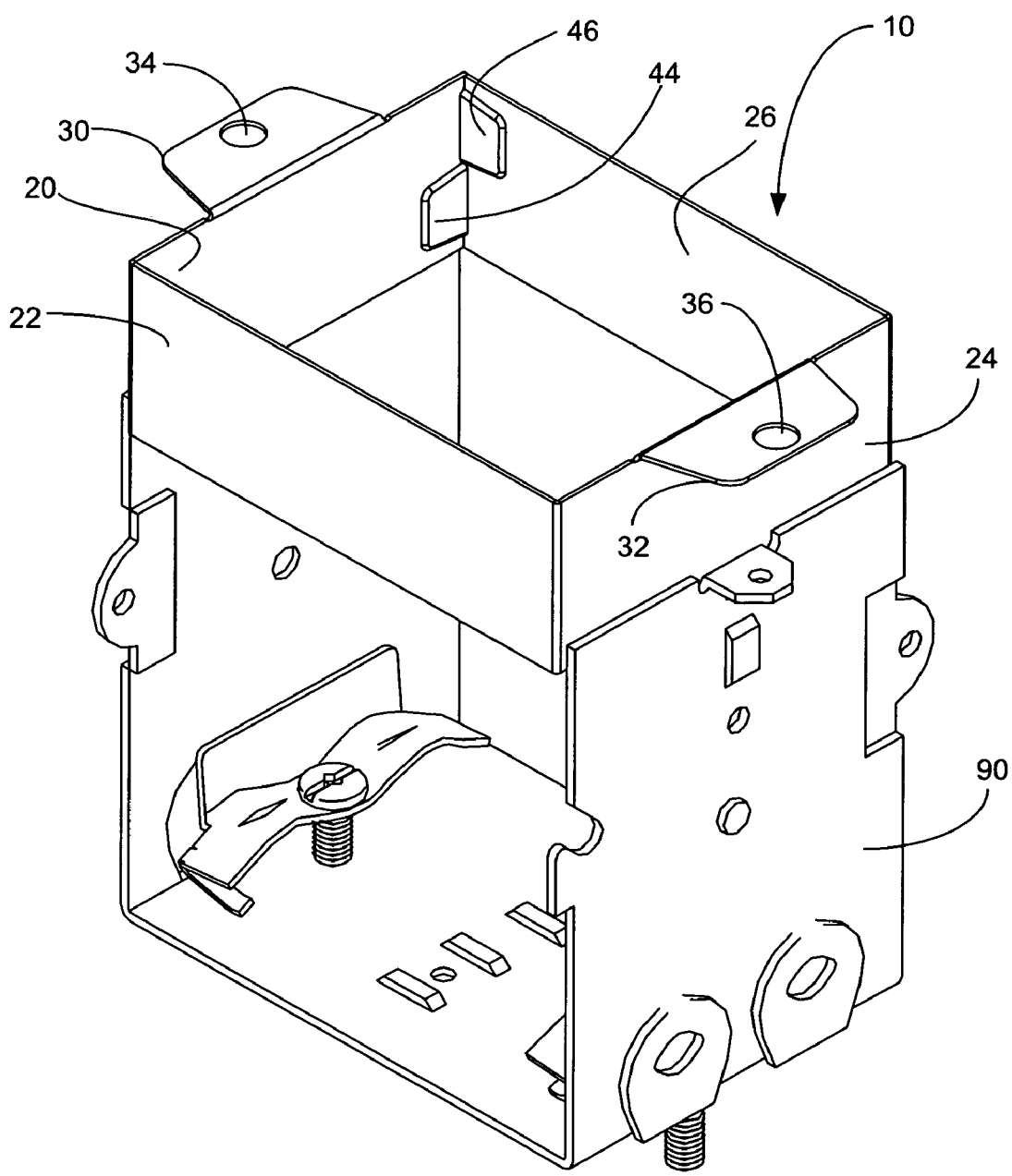
FIG. 6 is a peripheral view of a rectangular embodiment of the extender and an electrical outlet box after they are joined together.

FIG. 6 shows the extender 10 shown in FIG. 5 inserted into an existing box 90, with the exterior walls of the extender contacting the interior walls of the electrical box 90. This supports the side walls of the extender 10 and prevents the shape of the extender 10 form altering during use. The apertures 34, 36 in the tabs 30, 32 align with the mounting screw apertures of the electrical box 90.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An electrical box extender comprising:
   a side wall having a length with first and second ends and a width with first and second edges, wherein the side wall is configured so that the first end contacts the second end;
   a first member extending from the first end;
   a first embossed area on the first end;
   a second member extending from the second end; and
   a second embossed area on the second end;
   wherein the first member is bent so that it contacts the second embossed area and the second member is bent so that it contacts the first embossed area to connect the first and second ends.

2. The electrical box extender according to claim 1, wherein the side wall comprises four, six or eight lengthwise wall sections which are configured to form two, three or four pairs, respectively, of opposing and substantially parallel wall sections.

3. The electrical box extender according to claim 1, wherein the side wall is substantially round.

4. The electrical box extender according to claim 2, further comprising a pair of tabs extending from the first edge on opposing wall sections, wherein each tab has a mounting screw aperture.

5. The electrical box extender according to claim 1, wherein the first embossed area comprises a first aperture or a first depressed area and the second embossed area comprises a second aperture or a second depressed area, wherein the first member comprises a first raised portion and the second member comprises a second raised portion, and wherein the first aperture or the first depressed area engagingly receives the second raised portion and the second aperture or the second depressed area engagingly receives the first raised portion.

6. The electrical box extender according to claim 2, wherein the four, six or eight lengthwise wall sections are formed by bending the side wall by approximately 90, 60 or 45 degrees, respectively, at three, five or seven bending points.

7. The electrical box extender according to claim 1, wherein the first member has a first width and the second member has a second width and wherein both the first width and second width are less than one half the width of the side wall.

8. The electrical box extender according to claim 1, wherein the width of the side wall has a midpoint and the first member is located between the first edge and the midpoint of the side wall and the second member is located between the second edge and the midpoint of the side wall.

9. The electrical box extender according to claim 8, wherein the first embossed area is located between the second edge and the midpoint and the second embossed area is located between the first edge and the midpoint.

10. The electrical box extender according to claim 2, wherein the side wall further comprises three, five or seven grooves extending substantially perpendicular to the length.

11. An electrical box extender comprising:
a side wall having a length and a width and comprising a first end, a second end, a first edge and a second edge, wherein the side wall is configured so that the first end contacts the second end;
a first member extending from the first end;
a first embossed area on the first end;
a second member extending from the second end;
a second embossed area on the second end; and
a pair of tabs on the first edge of each extending away from each other, wherein each tab has a mounting screw aperture,
wherein the first member is bent so that it contacts the second embossed area and the second member is bent so that it contacts the first embossed area to connect the first and second ends.

12. The electrical box extender according to claim 11, wherein the side wall comprises four, six or eight lengthwise wall sections which are configured to form two, three or four pairs, respectively, of opposing and substantially parallel wall sections.

13. The electrical box extender according to claim 11, wherein the side wall is substantially round.

14. The electrical box extender according to claim 11, wherein the first embossed area comprises a first aperture or a first depressed area and the second embossed area comprises a second aperture or a second depressed area, wherein the first member comprises a first raised portion and the second member comprises a second raised portion, and wherein the first aperture or the first depressed area engagingly receives the second raised portion and the second aperture or the second depressed area engagingly receives the first raised portion.

15. The electrical box extender according to claim 12, wherein the four, six or eight lengthwise wall sections are formed by bending the side wall by approximately 90, 60 or 45 degrees, respectively, at three, five or seven bending points.

16. The electrical box extender according to claim 11, wherein the first member has a first width and the second member has a second width and wherein both the first width and the second width are less than one half the width of the side wall.

17. The electrical box extender according to claim 11, wherein the width of the side wall has a midpoint and the first member is located between the first edge and the midpoint of the side wall and the second member is located between the second edge and the midpoint of the side wall, and wherein the first embossed area is located between the second edge and the midpoint and the second embossed area is located between the first edge and the midpoint.

* * * * *